(12) United States Patent
Lee et al.

(10) Patent No.: US 9,485,384 B2
(45) Date of Patent: Nov. 1, 2016

(54) MOBILE TERMINAL AND CONTROLLING METHOD THEREOF

(71) Applicant: LG ELECTRONICS INC., Seoul (KR)

(72) Inventors: Hwasub Lee, Seoul (KR); Heeyoung Kim, Seoul (KR); Sooyong Park, Seoul (KR); Hyojin Lee, Seoul (KR); Ickjun Kim, Seoul (KR); Eunhye Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 14/567,663

(22) Filed: Dec. 11, 2014

(65) Prior Publication Data

US 2015/0222780 A1    Aug. 6, 2015

(30) Foreign Application Priority Data

Feb. 3, 2014    (KR) .................. 10-2014-0012042

(51) Int. Cl.
| | |
|---|---|
| *H04N 5/76* | (2006.01) |
| *H04N 1/21* | (2006.01) |
| *H04N 5/232* | (2006.01) |
| *H04N 5/222* | (2006.01) |

(52) U.S. Cl.
CPC ........ *H04N 1/2129* (2013.01); *H04N 5/23216* (2013.01); *H04N 5/23219* (2013.01); *H04N 5/23293* (2013.01)

(58) Field of Classification Search
CPC ............ H04N 5/225; H04N 5/23295; H04N 1/00416; G03B 31/00; G02B 7/09
USPC .............. 348/207.99, 240.99, 231.4, 333.02, 348/333.12
See application file for complete search history.

(56) References Cited

U.S. PATENT DOCUMENTS

| | | | | |
|---|---|---|---|---|
| 4,862,278 A | * | 8/1989 | Dann ..................... | H04R 1/342 348/240.99 |
| 6,931,138 B2 | * | 8/2005 | Kawamura ............ | H04R 1/406 348/231.4 |
| 2006/0125928 A1 | * | 6/2006 | Wolcott ............. | H04N 1/00307 348/211.2 |
| 2012/0076304 A1 | * | 3/2012 | Suzuki ...................... | H04S 7/30 381/1 |
| 2013/0342731 A1 | * | 12/2013 | Lee ..................... | H04N 5/23293 348/231.4 |
| 2013/0343572 A1 | * | 12/2013 | Lee ......................... | H04M 1/03 381/92 |
| 2014/0085538 A1 | * | 3/2014 | Kaine .................... | H04N 9/802 348/462 |
| 2015/0146078 A1 | * | 5/2015 | Aarrestad .......... | H04N 5/23212 348/345 |

\* cited by examiner

*Primary Examiner* — Kelly L Jerabek
(74) *Attorney, Agent, or Firm* — Lee, Hong, Degerman, Kang & Waimey

(57) ABSTRACT

A mobile terminal and controlling method thereof are disclosed. The present invention discloses that an audio of an audio file linked to an image is outputted in a manner of being amplified centering on a subject in the image, whereby a user can be provided with a further emotionally visual/auditory image viewer environment.

20 Claims, 24 Drawing Sheets

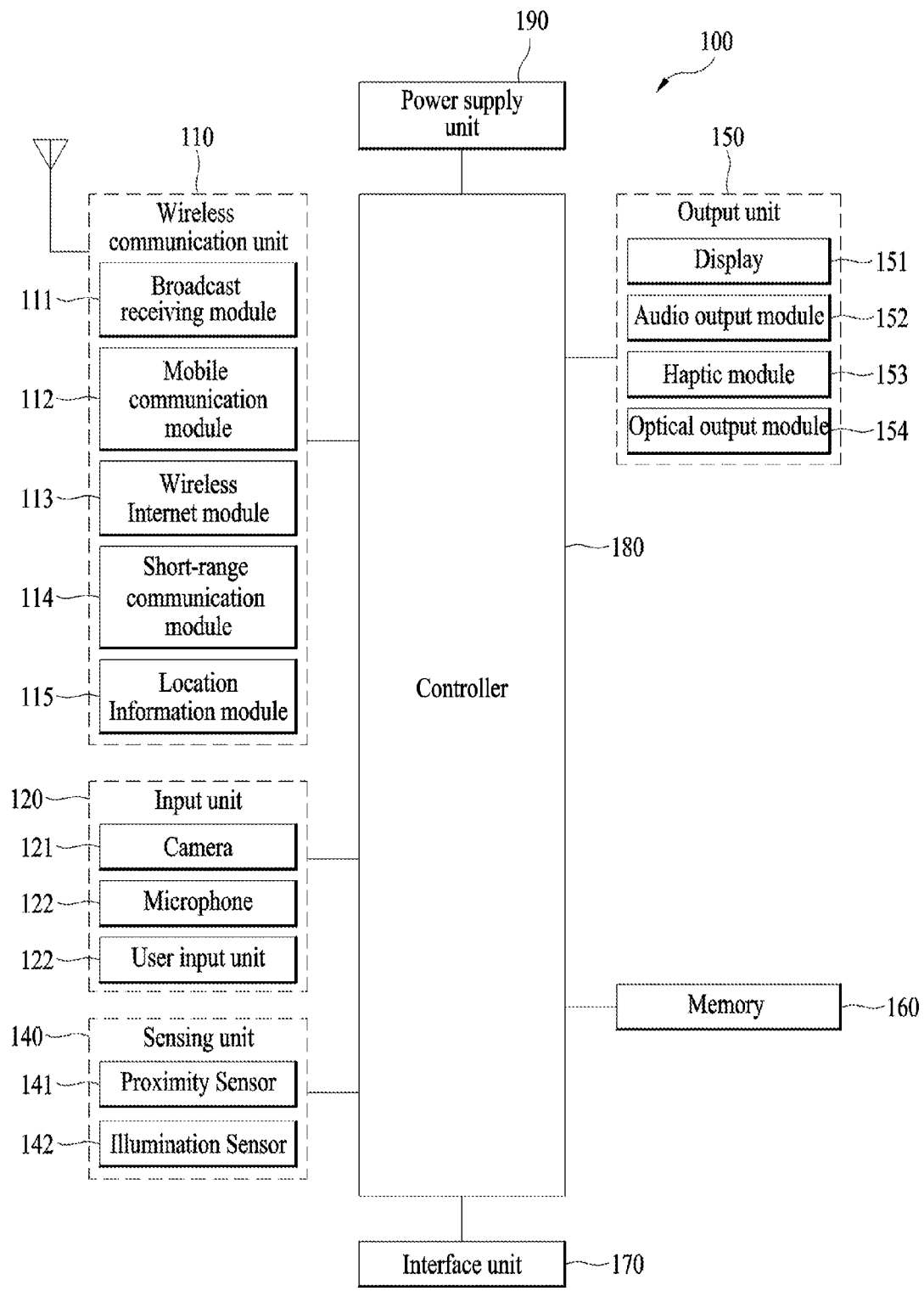

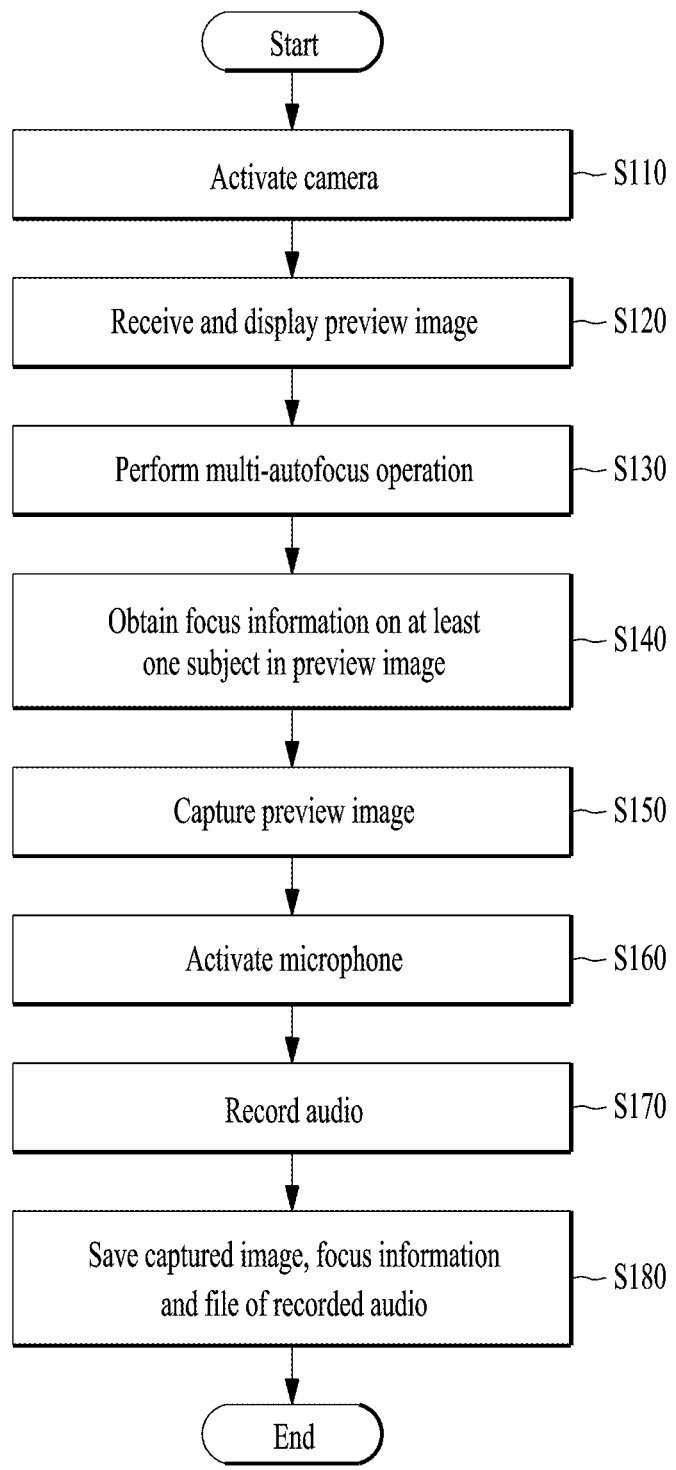

MOBILE TERMINAL AND CONTROLLING METHOD THEREOF

Pursuant to 35 U.S.C. §119(a), this application claims the benefit of earlier filing date and right of priority to Korean Application No. 10-2014-0012042, filed on Feb. 3, 2014, the contents of which are hereby incorporated by reference herein in their entirety.

BACKGROUND OF THE INVENTION

1. Field of the Invention

The present invention relates to a mobile terminal, and more particularly, to a mobile terminal and a method of controlling the mobile terminal.

2. Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

According to a photographing function of a camera provided to a terminal, after a photo has been captured, a function of linking an audio file to the captured photo is currently provided.

In particular, a user takes a photo at a desired place and then saves an audio file of recording sound of the photo-taken place. Thereafter, if the photo is displayed, the terminal plays the audio file linked to the photo, the user is able to listen to the surrounding sound of the photo-taken place.

However, when a photo is displayed, the related art function simply plays an audio file linked to the displayed photo but is unable to adjust a sound level of audio dynamically in accordance with a subject in the photo.

SUMMARY OF THE INVENTION

Accordingly, an object of the present invention is to address the above-noted and other problems.

One object of the present invention is to provide a mobile terminal and controlling method thereof as follows. First of all, when an image including at least one subject is displayed, an audio file linked to the image is played and audio of the currently played audio file is also outputted in a manner of being amplified centering on the subject.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a memory, a camera configured to obtain image data including a first subject and a second subject, a display, a microphone configured to obtain audio data to be linked to the image data, an audio output unit, a controller configured to recognize and select at least the first subject or the second subject in the image data, cause the memory to store the obtained image data and focus information related to the recognition and selection of at least the first subject or the second subject, cause the microphone to zoom in on at least a first sound generated from the selected first subject or a second sound generated from the selected second subject based on the focus information such that at least the first sound or second sound is selectively amplified while the audio data is obtained, cause the memory to store the obtained audio data such that the stored audio data and focus information are linked to the stored image data, cause the display to display the stored image data and cause the audio output unit to output the stored audio data based on the stored focus information, wherein at least the first sound or the second sound is selectively amplified during the output of the stored audio data while the linked image data is displayed.

In another aspect of the present invention, as embodied and broadly described herein, a method of controlling a mobile terminal according to the present invention may include the steps of obtaining, via the camera, image data including a first subject and a second subject, obtaining, via the microphone, audio data to be linked to the image data, recognizing and selecting at least the first subject or the second subject in the image data, storing the image data and focus information related to the recognition and selection of at least the first subject or the second subject, zooming in on at least a first sound generated from the selected first subject or a second sound generated from the selected second subject based on the focus information such that at least the first sound or second sound is selectively amplified while the audio data is obtained, storing the obtained audio data such that the stored audio data and focus information are linked to the stored image data, displaying the stored image data on the display and outputting the stored audio data via the audio output unit based on the stored focus information, wherein at least the first sound or the second sound is selectively amplified during the output of the stored audio data while the stored image data is displayed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure.

FIG. 5 is a flowchart of a process for creating an image and an audio file to be linked to the image according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
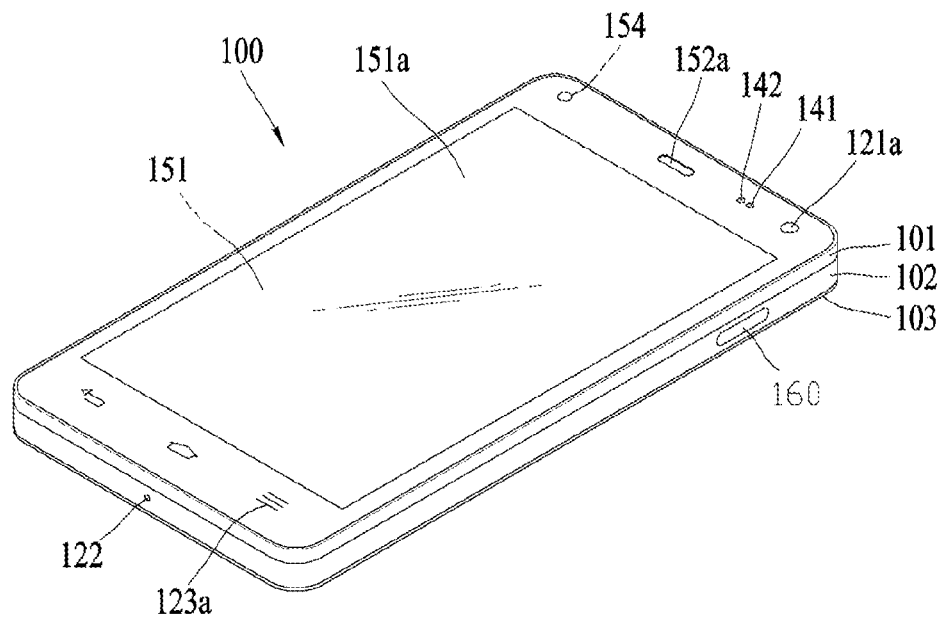
FIGS. 1B and 1C are conceptual views of one example of the mobile terminal, viewed from different directions.
Figure 1C:
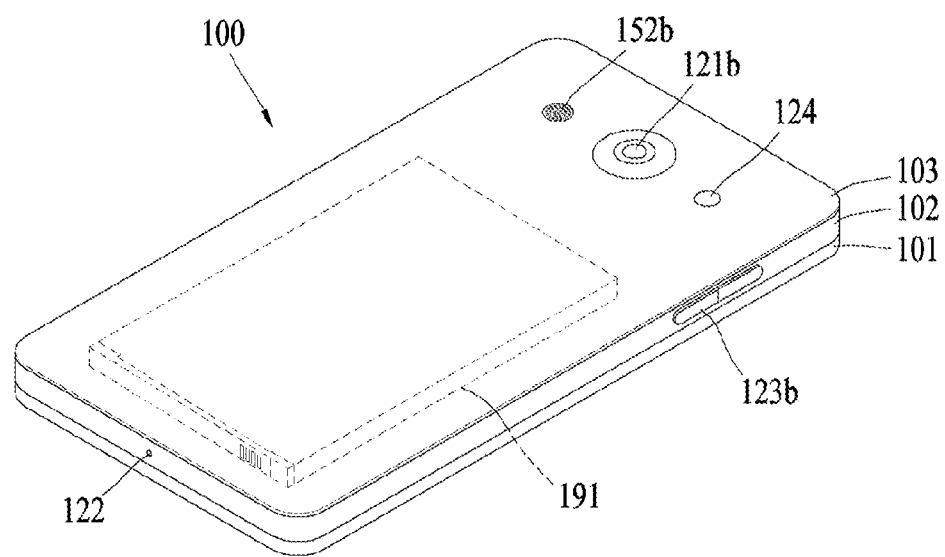

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
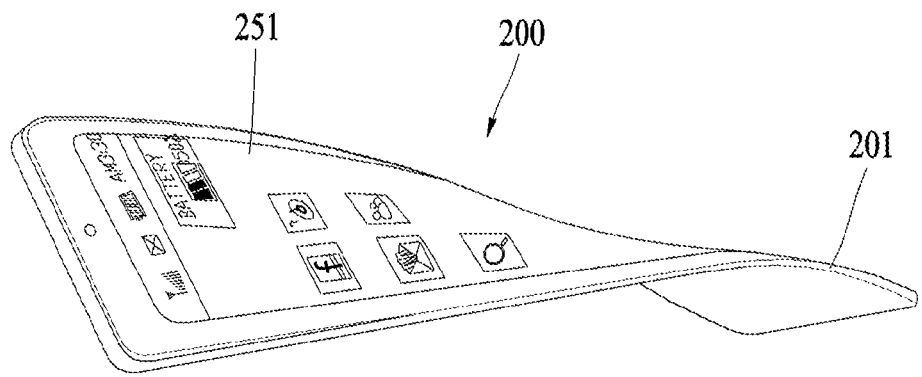
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
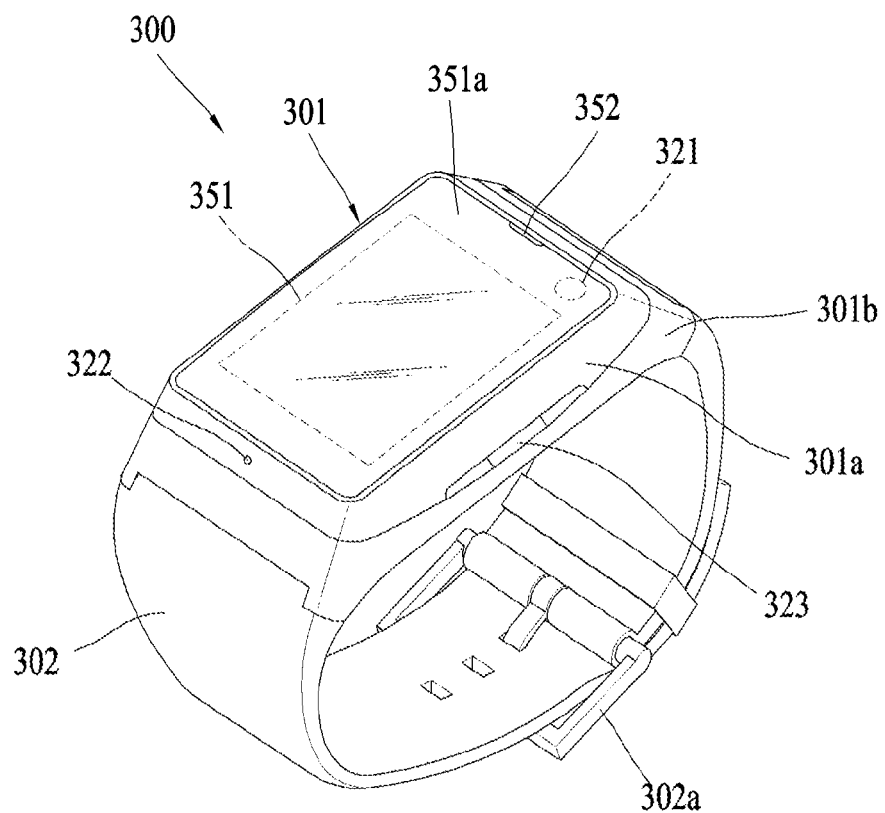
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
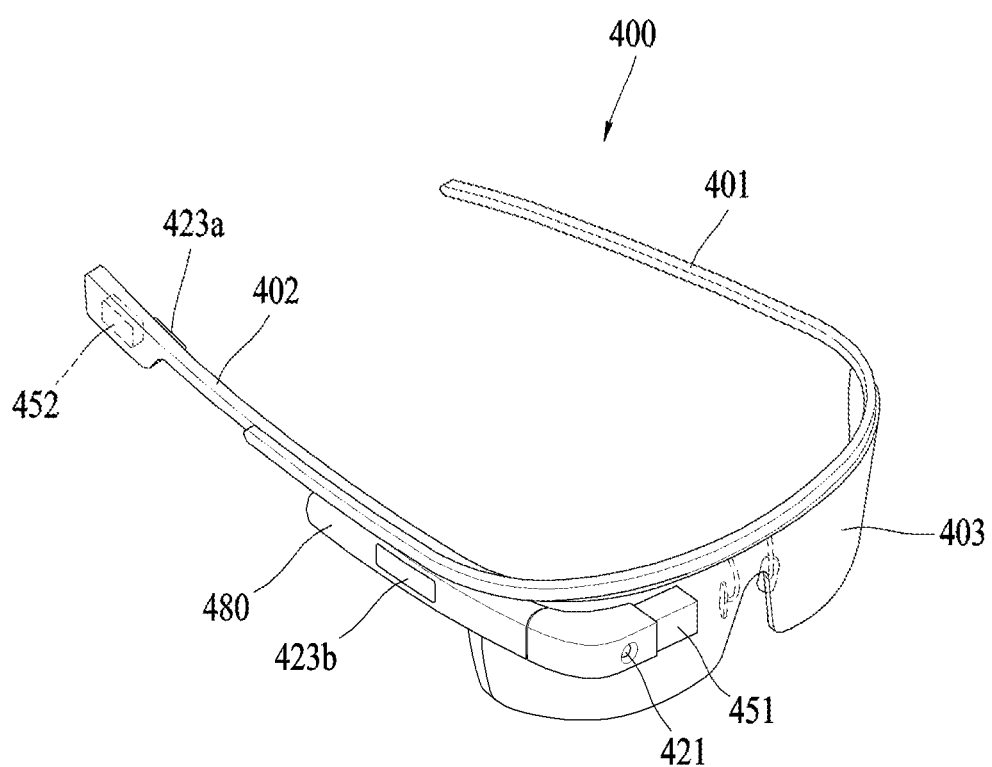
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

In the following description, embodiments related to a controlling method implemented in the above-configured mobile terminal are explained with reference to the accompanying drawings.

With reference to FIGS. 5 to 21, a process for zooming audio linked to an image according to the present invention is described in detail as follows.

According to an audio zooming function of the present invention, after an image captured by a camera has been displayed, when an audio file recorded in capturing the image is played, an audio of the currently played audio file is outputted centering on a subject in the image in a manner of being amplified.

In particular, if the audio zooming function of the present invention is enabled, an audio, which is included in the audio of the currently played audio file and comes from a region of the subject in the image, is outputted by being amplified, while an audio, which is included in the audio of the currently played audio file of a peripheral region, of the subject is outputted by being turned down. Hence, a user is able to intensively listen to the audio coming from the subject in the image while watching the image.

A process for creating an image and an audio file to link to the image is described in detail with reference to FIGS. 5, 6A, 6B, 7A, 7B, 8A, 8B, 9A, 9B and 9C as follows.

FIG. 5 is a flowchart of a process for creating an image and an audio file to be linked to the image according to one embodiment of the present invention.

FIGS. 6A, 6B, 7A, 7B, 8A, 8B, 9A, 9B and 9C are diagrams to describe a process for creating an image and an audio file to be linked to the image according to one embodiment of the present invention.

Referring to FIGS. 5, 6A, 6B, 7A, 7B, 8A, 8B, 9A, 9B and 9C, if a camera function is selected through the touchscreen 151 or the user input unit 123, the controller 180 of the mobile terminal 100 activates the camera 121 [S110] and then displays a preview image, which is received through the camera 121, on the touchscreen 151 [S120].

In doing so, the camera 121 of the present invention supports a multi-autofocus function for at least one or two subjects (or parts) included in the preview image.

In particular, if a command for enabling a multi-autofocus is inputted by a user in camera photographing mode, the controller 180 controls the camera 121 to be focused on the at least one or two subject currently included in the preview image [S130].

The controller 180 obtains a focus information on the at least one or two subjects currently included in the preview image from the camera 121 [S140]. If a command for capturing the preview image is inputted, the controller 180 captures a preview image at the timing point of inputting the capture command [S150].

If a function of recording an audio to be linked to the captured image is selected, the controller 180 enables the microphone 122 [S160], records an audio inputted through the microphone 122 [S170], and then controls the captured image, the focus information on the subjects) in the image and the recorded file to be saved in the memory 170 in a manner of being linked to one another [S180].

In this case, the recorded audio file can include at least one of a peripheral sound of a place, at which the image is captured, and a voice of the subjects) in the image.

Moreover, the focus information can include at least one of a location and size of a focus region, in which the focused subject(s) is displayed, in the image, a focal distance, a depth, and a distance to the subject(s).

Figure 6A:
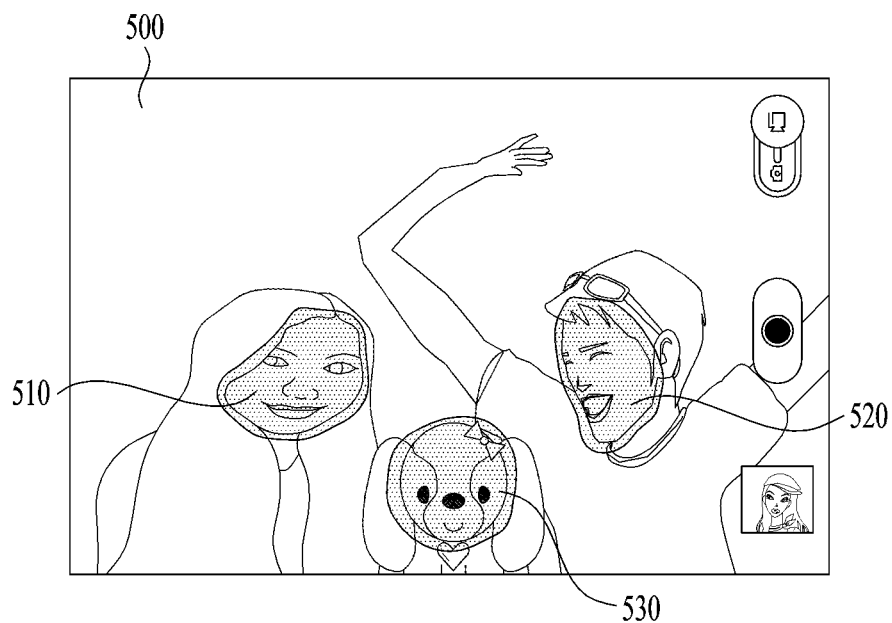
FIGS. 6A, 6B, 7A, 7B, 8A, 8B, 9A, 9B and 9C are diagrams to describe a process for creating an image and an audio file to be linked to the image according to one embodiment of the present invention.
Figure 6B:
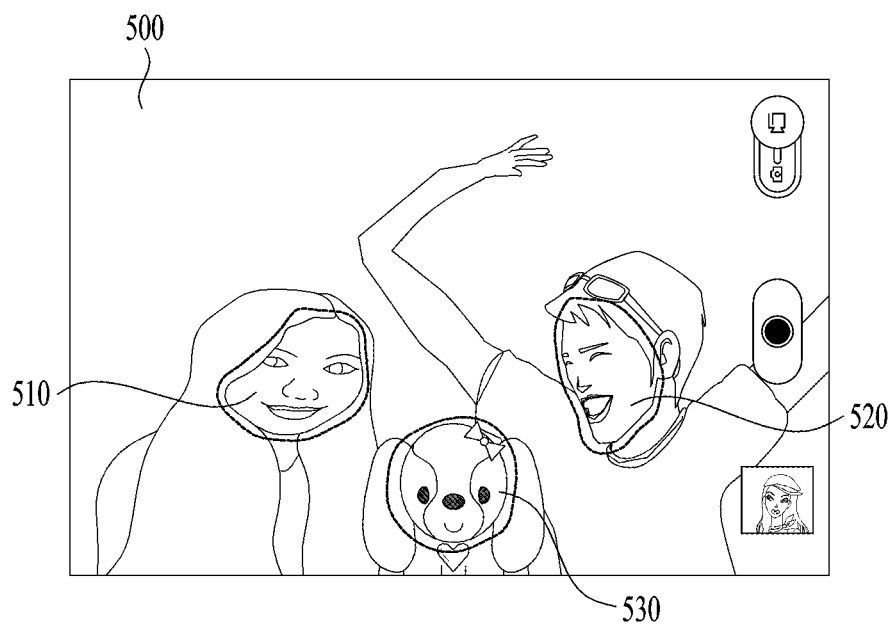

FIGS. 6A and 6B show that a preview image 500 containing at least one or more subjects 510, 520 and 530, which is received through the camera 121, is displayed on the touchscreen 151.

In this case, the controller 180 recognizes faces of the subjects 510, 520 and 530 using face recognition algorithm and is then able to give a visual effect to the recognized faces of the subjects 510, 520 and 530 in order for a user to identify face regions of the subjects 510, 520 and 530 in the preview image 500 [FIG. 6A, FIG. 6B].

For instance, referring to FIG. 6A, the controller 180 controls a highlight in specific color to be displayed on the face regions of the recognized subjects 510, 520 and 530 in the preview image 500, thereby visually informing a user of the result of the recognition of the faces of the subjects 510, 520 and 530 in the currently displayed preview image 500.

For another instance, referring to FIG. 6B, the controller 180 controls the face regions of the recognized subjects 510, 520 and 530 in the preview image 500 to be outlined in specific color, thereby visually informing a user of the result of the recognition of the faces of the subjects 510, 520 and 530 in the currently displayed preview image 500.

Thereafter, the controller 180 focuses the camera 121 on the face regions of the recognized subjects 510, 520 and 530 in the preview image 500 and then obtains focus information on the face regions of the focused subjects 510, 520 and 530. In particular, the reason for recognizing the faces of the subjects 510, 520 and 530 in the preview image 500 is to obtain the focus information of the subjects 510, 520 and 530 in the preview image 500.

Figure 7A:
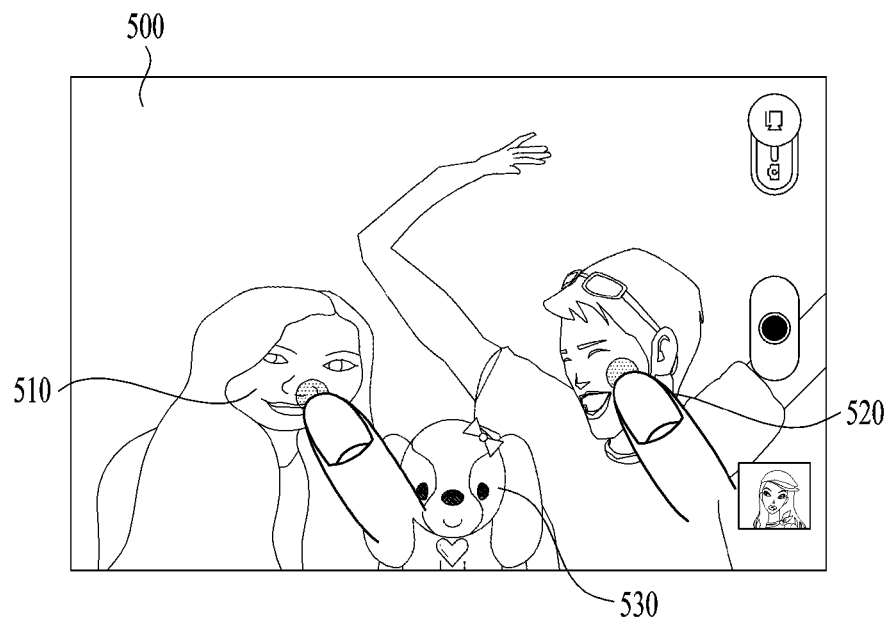
Figure 7B:
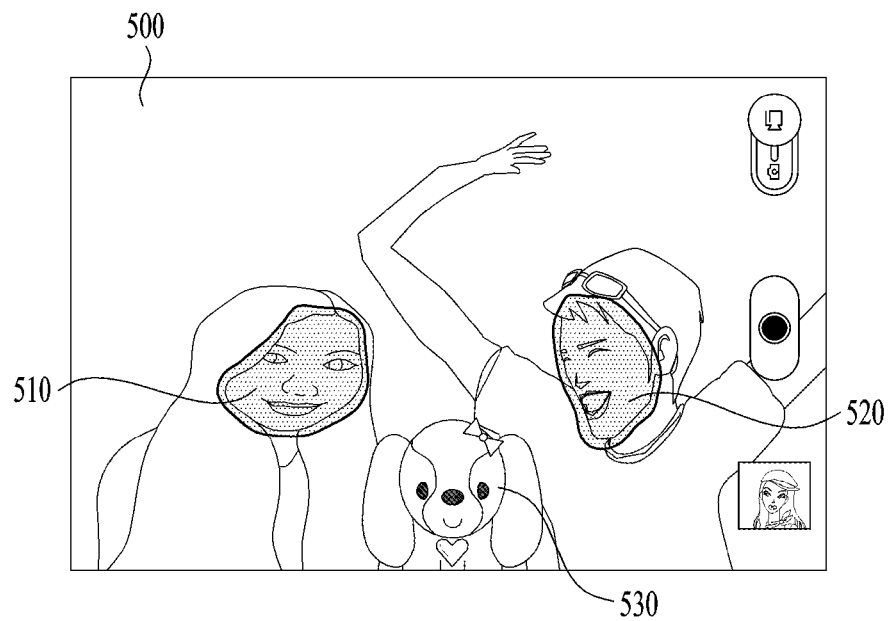

Referring to FIG. 7A, if at least one point in a preview image 500 is touched, the controller 180 recognizes at least one or more subjects 510 and 520 included in the touched point using a face recognition algorithm. Then, referring to FIG. 7B, the controller 180 is able to give a visual effect to a face of each of the recognized subjects 510 and 520 so that a user can identify face regions of the recognized subjects 510 and 520 within the preview image 500.

Moreover, if at least one region in the preview image 500 is designated by a user's touch drag gesture, the controller 180 recognizes a face of at least one subject included in the designated region using a face recognition algorithm. The controller 180 is then able to give a visual effect to the recognized face of the subject so that a face region of the recognized subject can be identified in the preview image 500 by the user.

Subsequently, the controller 180 focuses the camera 121 on the face regions of the recognized subjects 510 and 520 in the preview image 500 and then obtains focus information on the focused face regions of the subjects 510 and 520.

Figure 8A:
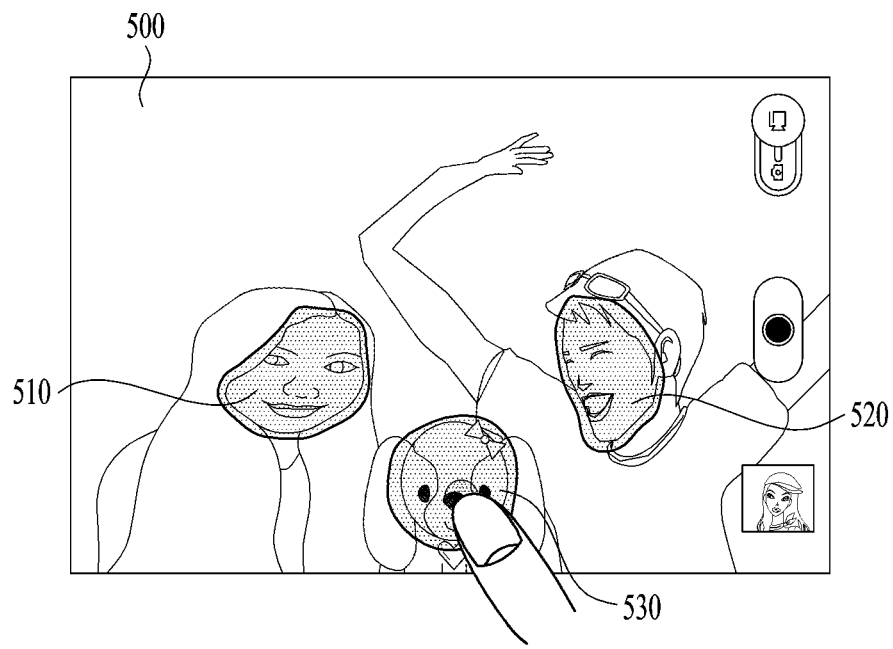
Figure 8B:
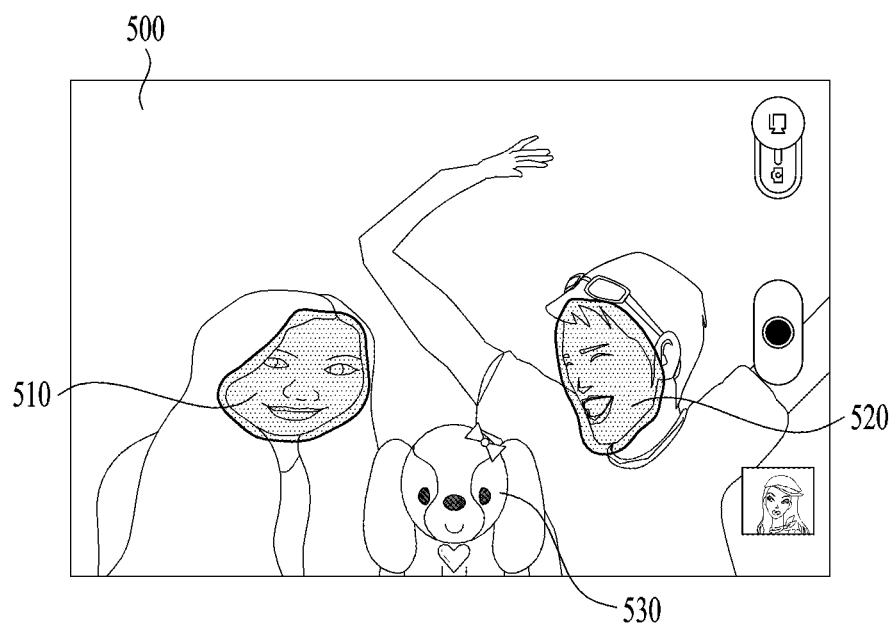

In doing so, while the at least two or more subjects 510, 520 and 530 are recognized in the preview image 500, if one of the recognized subjects 510, 520 and 530 is touched [FIG. 8A], the controller 180 obtains focus information by focusing on the subjects 510 and 520 except the touched subject 530 [FIG. 8B].

Figure 9A:
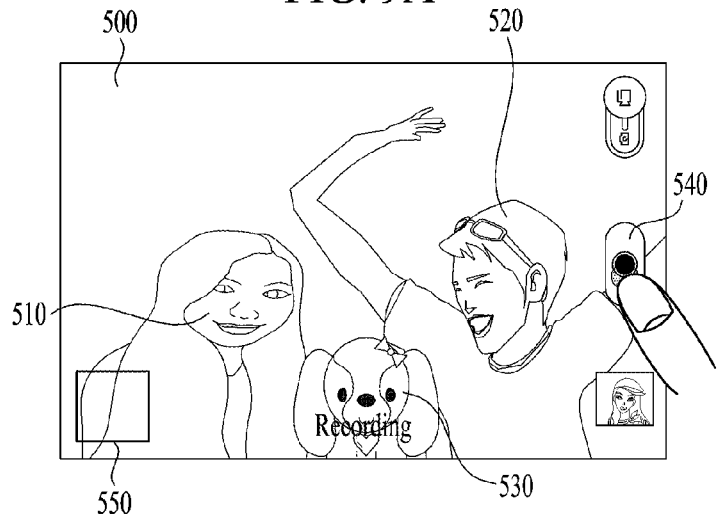
Figure 9B:
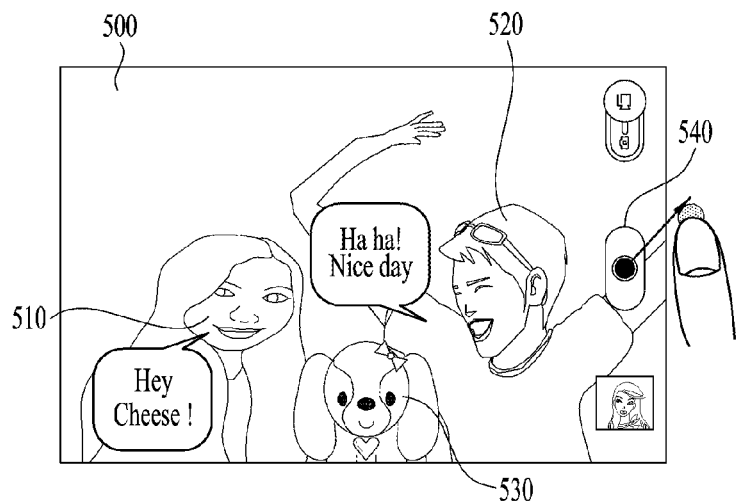

Subsequently, referring to FIGS. 9A, 9B and 9C, after an image has been captured from the preview image 500, if a record key 540 for recording an audio to link to the image is touched [FIG. 9A], the controller 180 records an audio containing voices of the subjects 510 and 530 by activating the microphone 122 [FIG. 9B]. In doing so, if a user voice erasing item 550 is touched, the controller 180 can erase the user's voice from the recorded audio.

Figure 9C:
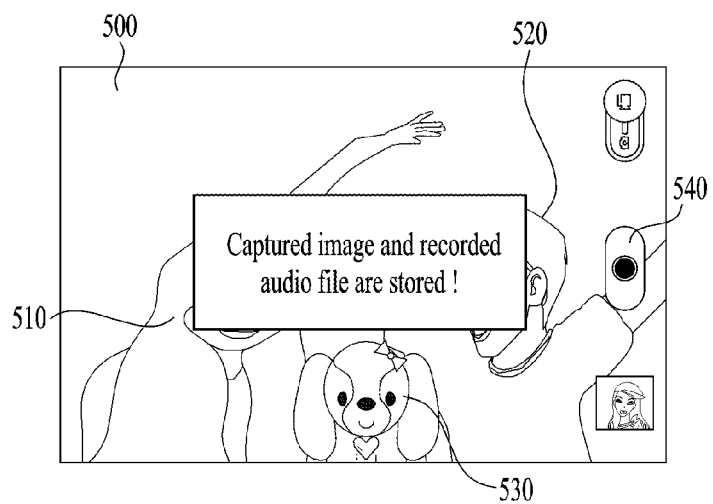

If the recording is completed, referring to FIG. 9C, the controller 180 controls the captured image, the focus information of the subjects 510 in the image and a file of the recorded audio to be saved in the memory 170 in a manner of being linked to one another.

In doing so, the controller 180 records the audio inputted through the microphone 122 while the touch to the record key 540 is maintained. If the touch to the record key 540 is released, the controller 180 can end the recording of the audio.

If the record key 540 is touched, the controller 180 records an audio inputted through the microphone 122. If the record key 540 is re-touched, the controller 180 can end the recording of the audio.

If the record key 540 is touched in the course of recording the audio, the controller 180 pauses the recording of the audio and is able to save the audio, which has been recorded until the touch to the record key 540, and the captured image in the memory 170 temporarily.

In this case, while the audio and the image are temporarily saved, the user is able to take a photo again using the camera 122. If the record key 540 is touched again, the controller 180 redisplays the temporarily saved image and records an audio through the microphone 122 again. If the recording is ended, the controller 180 creates an audio file by combining the re-recorded audio and the former temporarily saved audio together and is then able to save the created audio file.

After the record key 540 has been touched, while the microphone 122 is active, if there is no input of an audio for a preset time, the controller 122 deactivates the microphone 122 and then saves the captured image in the memory 170 without the recording of the audio.

So far, the process for creating the image and the audio file to link to the image is described in detail with reference to FIGS. 5, 6A, 6B, 7A, 7B, 8A, 8B, 9A, 9B and 9C.

In the following description, a process for zooming an audio of an audio file linked to an image according to the present invention is explained in detail with reference to FIGS. 10 to 21.

Figure 10:
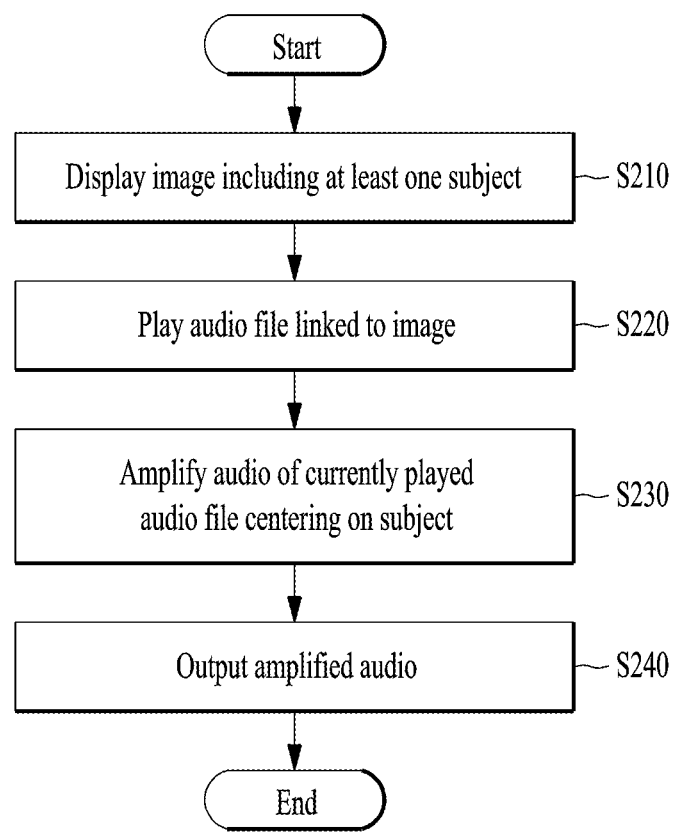
FIG. 10 is a flowchart of a process for zooming audio linked to an image according to one embodiment of the present invention.

FIG. 10 is a flowchart of a process for zooming an audio linked to an image according to one embodiment of the present invention.

FIGS. 11A, 11B, 12A, 12B, 13A, 13B, 13C, 13D, 14A, 14B, 14C, 14D, 15A, 15B, 15C, 15D, 16A, 16B, 16C, 17A, 17B, 17C, 18A, 18B, 19A, 19B, 19C, 20A, 20B, 21A, 21B and 21C are diagrams to describe a process for zooming audio linked to an image according to one embodiment of the present invention.

Referring to FIGS. 10, 11A, 11B, 12A, 12B, 13A, 13B, 13C, 13D, 14A, 14B, 14C, 14D, 15A, 15B, 15C, 15D, 16A, 16B, 16C, 17A, 17B, 17C, 18A, 18B, 19A, 19B, 19C, 20A, 20B, 21A, 21B and 21C, if an image created by the process described with reference to FIGS. 5 to 9 is selected, the controller 180 displays the selected image on the touchscreen 151 [S210].

For instance, if a user selects an image viewer function, the controller 180 activates the image viewer function and then displays a thumbnail list containing a thumbnail indicating the image on an active screen of the activated image viewer function. If the thumbnail is selected, the controller 180 can display the image. In this case, the image viewer function includes an image viewer application such as a gallery application installed in the mobile terminal 100 and the like.

The thumbnail has an icon shape smaller than an original size of the image and represents the whole image as a preview form.

After the image has been displayed, if a command for playing an audio file linked to the image is inputted, the controller 180 plays the audio file [S220].

The controller 180 amplifies an audio of the audio file, which is currently outputted through the audio output unit 152, centering on a subject in the image [S230] and then outputs the amplified audio [S240].

Figure 11A:
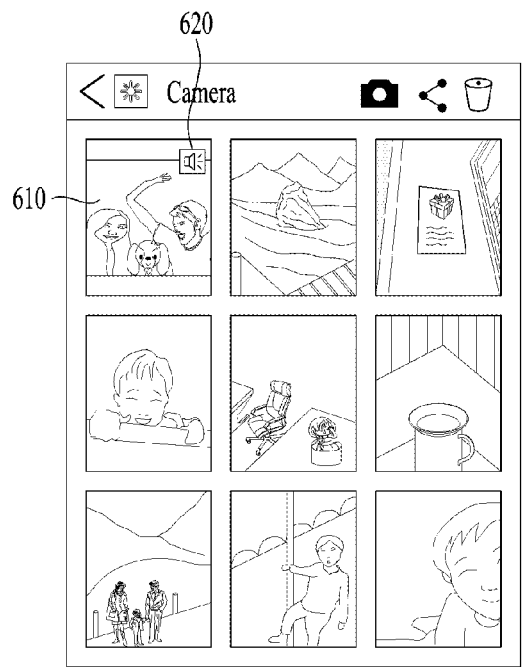
FIGS. 11A, 11B, 11C, 12A, 12B, 13A, 13B, 13C, 13D, 14A, 14B, 14C, 14D, 15A, 15B, 15C, 15D, 16A, 16B, 16C, 17A, 17B, 17C, 18A, 18B, 19A, 19B, 19C, 20A, 20B, 21A, 21B and 21C are diagrams to describe a process for zooming audio linked to an image according to one embodiment of the present invention.

FIG. 11A shows that a thumbnail list containing a thumbnail 610 indicating an image 500 having the audio file linked thereto is displayed on an image viewer screen.

Referring to FIG. 11A, the controller 180 is able to control an item 620, which indicates that the audio file is linked to the image 500, to be displayed within the thumbnail 610. Hence, if a user sees the item 620, the user can be aware that the audio file is linked to the image 500 corresponding to the thumbnail 610 having the item 620 displayed thereon.

Figure 11B:
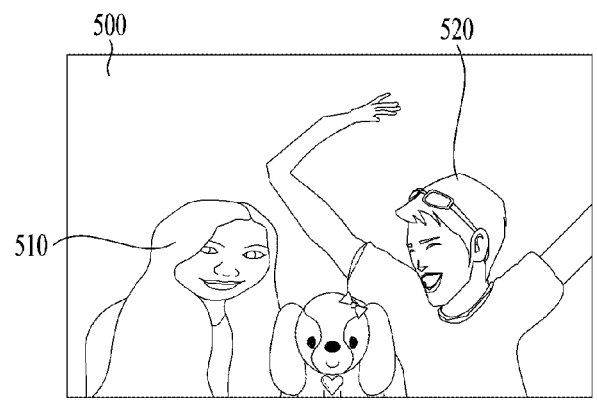

If a part of the thumbnail 610 except the item 620 is touched, referring to FIG. 11B, the controller 180 can display the whole image 500 corresponding to the thumbnail 610 without playing the audio file.

Figure 11C:
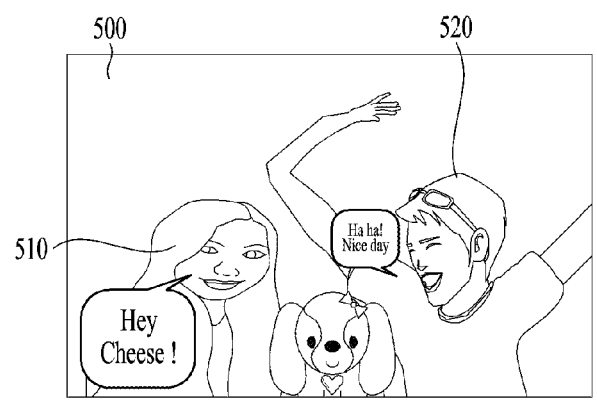

If the item 620 in the thumbnail 610 is touched, referring to FIG. 11C, the controller 180 displays the image 500, plays the audio file linked to the image 500, and controls an audio of the currently played audio file to be outputted in a manner of being amplified centering on a subject contained in the image, at the same time.

Figure 12A:
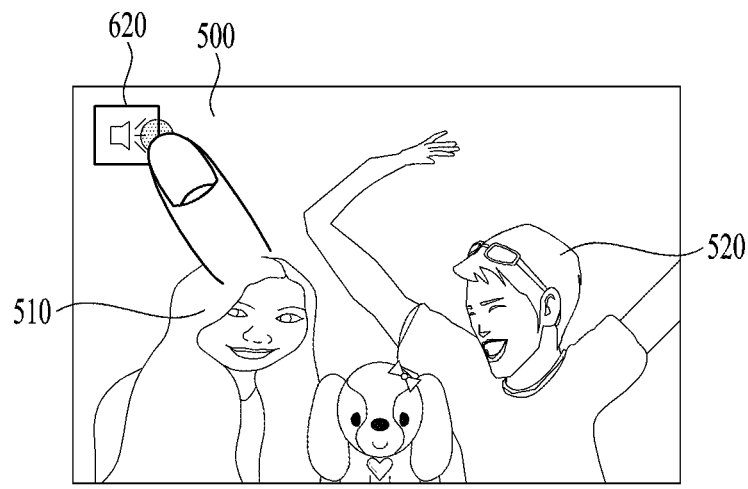

Referring to FIG. 12A, the controller 180 is able to control an item 620, which indicates that the audio file is linked to the image 500, to be displayed within the image 500. Hence, if a user sees the item 620, the user can be aware that the audio file is linked to the image 500.

Figure 12B:
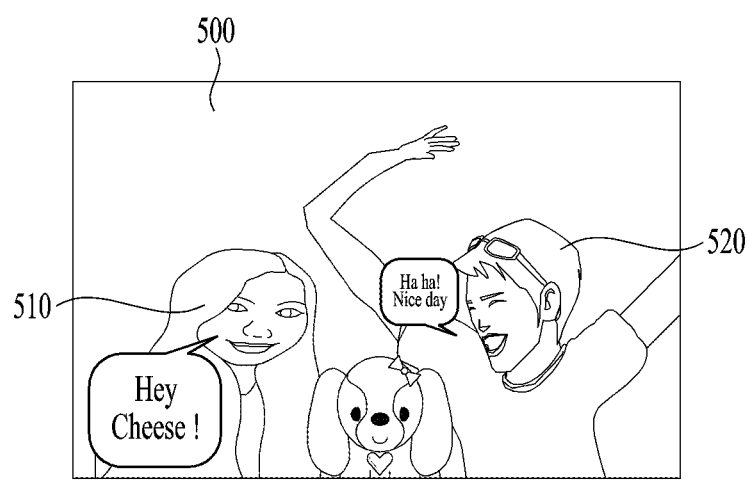

If the item 620 in the image 500 is touched, referring to FIG. 12B, the controller 180 plays the audio file linked to the image 500 and controls an audio of the currently played audio file to be outputted in a manner of being amplified centering on a subject contained in the image.

In doing so, the controller 180 can control the audio to be outputted in a manner of being amplified centering on the subject using a focus information of the subject in the image 500.

In particular, referring to FIGS. 13A, 13B, 13C, 13D, 14A, 14B, 14C and 14D, when the controller 180 amplifies the audio centering on the subject in the image 500, the controller 180 can differentiate an amplification level of the audio depending on a distance from the subject based on the focus information of the subject.

In more particular, referring to FIGS. 13A, 13B, 13C and 13D, when the controller 180 amplifies the audio centering on the subject in the image 500, the controller 180 can amplify the audio by multiple times in proportion to the distance from the subject. In doing so, if the distance from the subject increases, the controller 180 amplifies the audio more. If the distance from the subject decreases, the controller 180 amplifies the audio less.

Figure 13A:
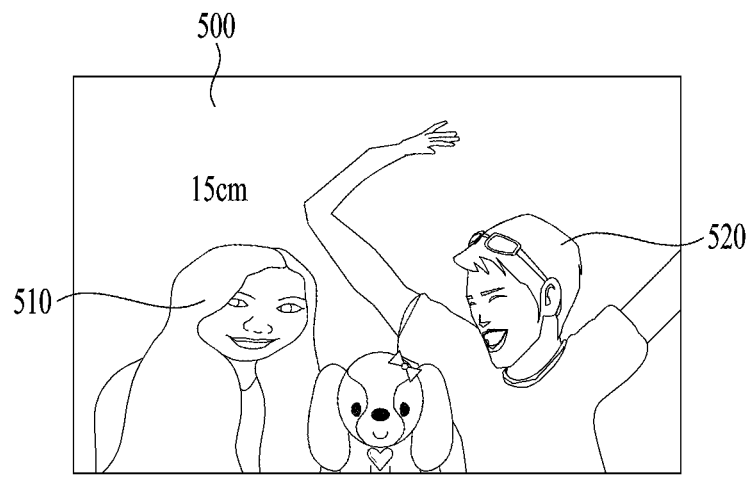

For instance, referring to FIG. 13A, if a focus information on a $1^{st}$ subject 510 in the image is saved in the memory 170 and a distance from the $1^{st}$ subject 510 included in the focus information is 15 cm, the controller 180 outputs the audio in a manner of amplifying the audio by 2 times centering on the $1^{st}$ subject 510.

Figure 13B:
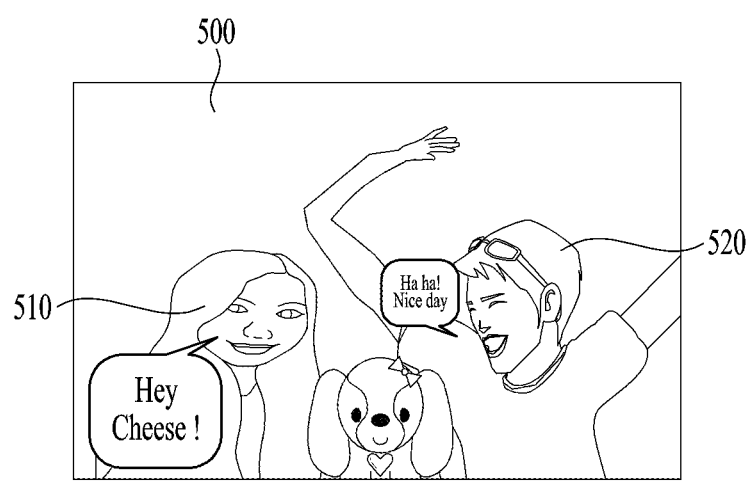
Figure 13C:
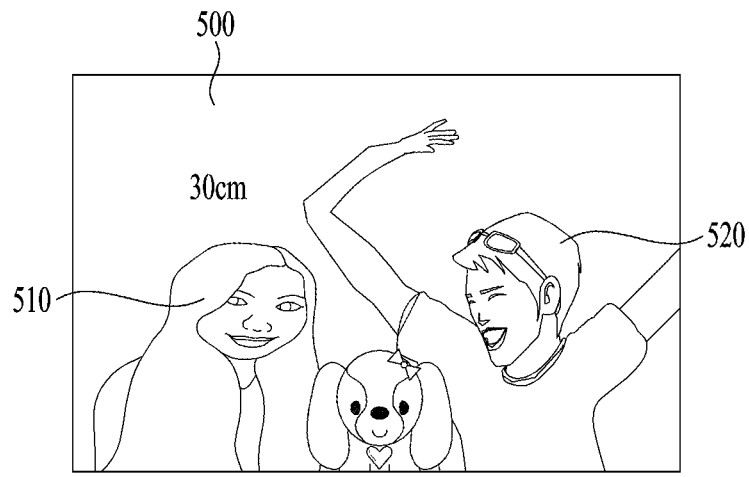
Figure 13D:
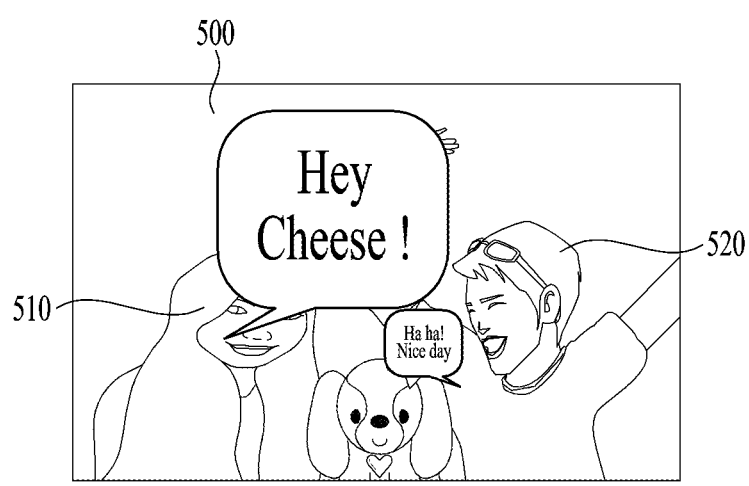

For another instance, referring to FIG. 13B, if a focus information on a $1^{st}$ subject 510 in the image is saved in the memory 170 and a distance from the $1^{st}$ subject 510 included in the focus information is 30 cm, the controller 180 outputs the audio in a manner of amplifying the audio by 4 times centering on the $1^{st}$ subject 510.

Moreover, referring to FIGS. 14A, 14B, 14C and 14D, when the controller 180 amplifies the audio centering on the subject in the image 500, the controller 180 can amplify the audio by multiple times in inverse proportion to the distance from the subject. In doing so, if the distance from the subject decreases, the controller 180 amplifies the audio more. If the distance from the subject increases, the controller 180 amplifies the audio less.

Figure 14A:
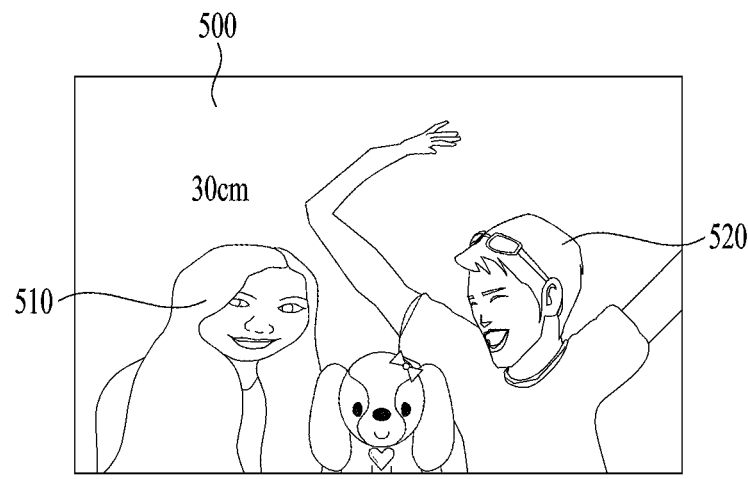

For instance, referring to FIG. 14A, if a focus information on a $1^{st}$ subject 510 in the image is saved in the memory 170 and a distance from the $1^{st}$ subject 510 included in the focus information is 30 cm, the controller 180 outputs the audio in a manner of amplifying the audio by 4 times centering on the $1^{st}$ subject 510.

Figure 14B:
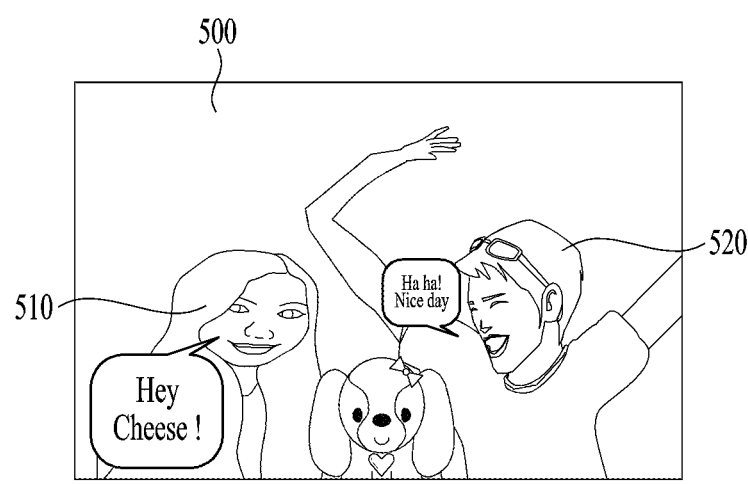
Figure 14C:
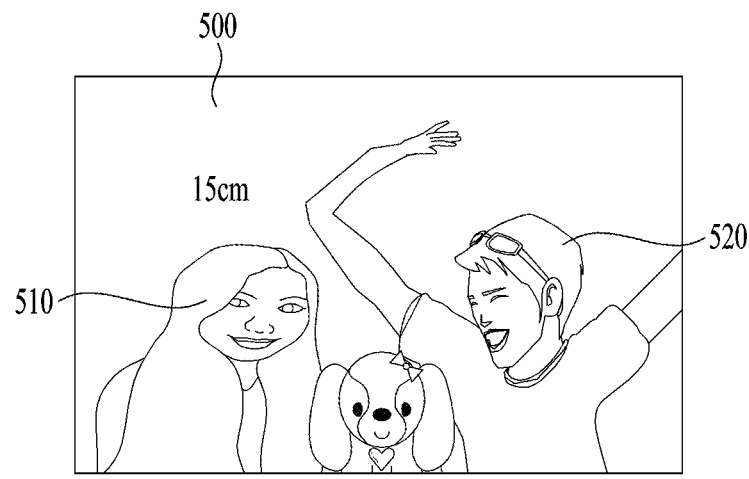
Figure 14D:
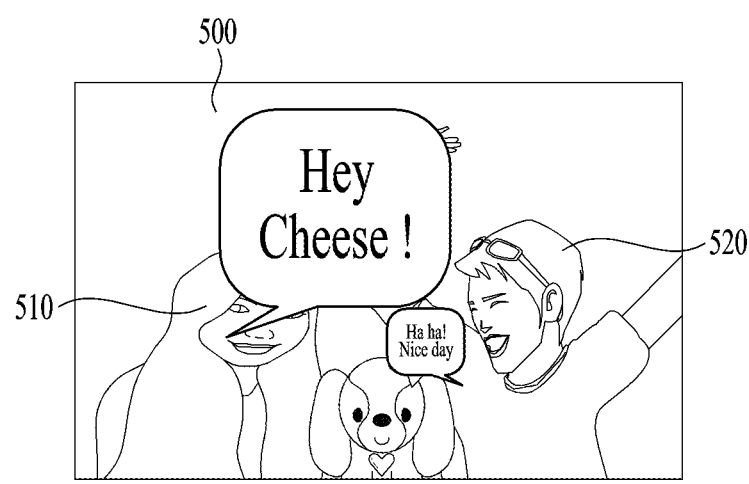

For another instance, referring to FIG. 14B, if a focus information on a $1^{st}$ subject 510 in the image is saved in the memory 170 and a distance from the $1^{st}$ subject 510 included in the focus information is 15 cm, the controller 180 outputs the audio in a manner of amplifying the audio by 2 times centering on the $1^{st}$ subject 510.

On the other hand, when the controller 180 amplifies the audio centering on a subject in the image 500, the controller 180 can differentiate an amplification level of the audio depending on a size of a focused region of the subject based on a focus information of the subject.

In particular, when the controller 180 amplifies the audio centering on a subject in the image 500, the controller 180 can amplify the audio by multiple times in proportion to a size of the focused region of the subject. In more particular, if the region of the focused region of the subject increases, the controller 180 can amplify the audio more. If the region of the focused region of the subject decreases, the controller 180 can amplify the audio less. On the other hand, when the controller 180 amplifies the audio centering on a subject in the image 500, the controller 180 can amplify the audio by multiple times in inverse proportion to a size of the focused region of the subject. In more particular, if the region of the focused region of the subject increases, the controller 180 can amplify the audio less. If the region of the focused region of the subject decreases, the controller 180 can amplify the audio more.

Meanwhile, referring to FIGS. 15A, 15B, 15C and 15D, if the audio is amplified and outputted centering on the subject in the image 500, the controller 180 can control the subject contained region to be displayed in a manner of being enlarged from the image 500. In particular, if a user sees the enlarged region, the user can be aware whether the currently amplified and outputted audio is a voice of the subject in the enlarged region.

Figure 15A:
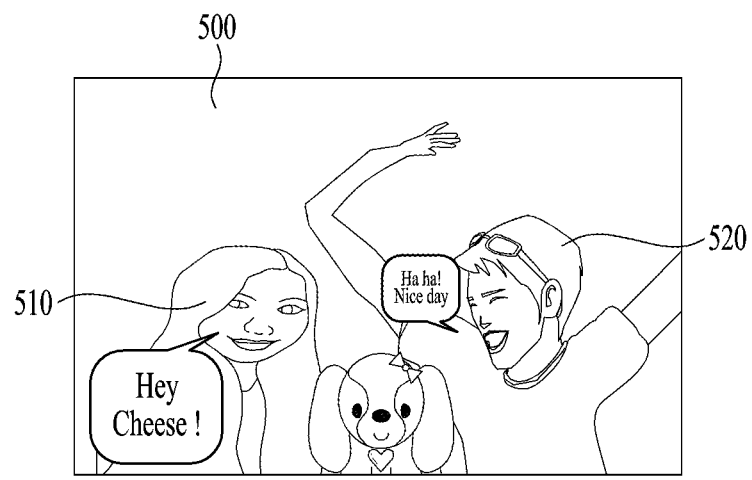

For instance, referring to FIG. 15A, if the audio is amplified and outputted centering on a $1^{st}$ subject 510 in the image 500, the controller 180 controls a region 500A containing the $1^{st}$ subject 510 to be displayed in a manner of being enlarged from the image 500.

Figure 15B:
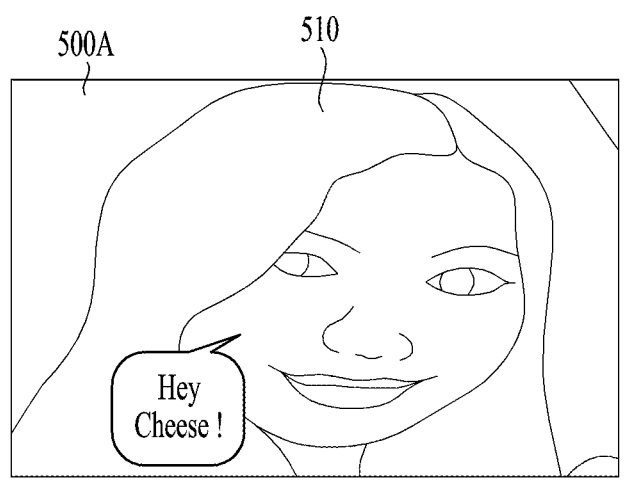
Figure 15C:
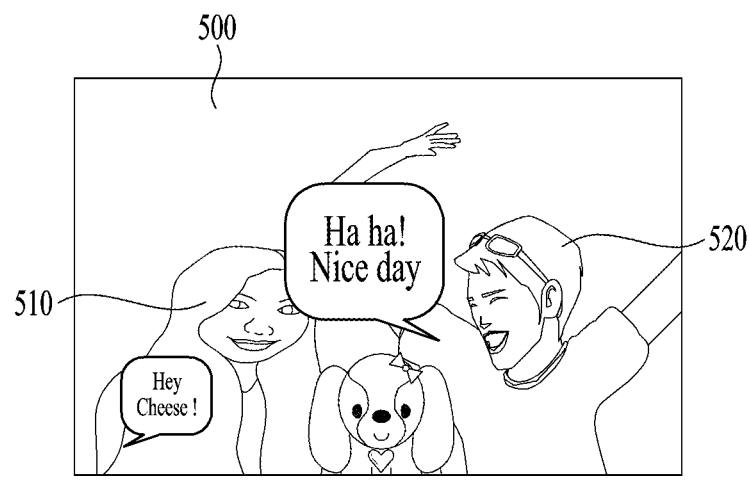
Figure 15D:
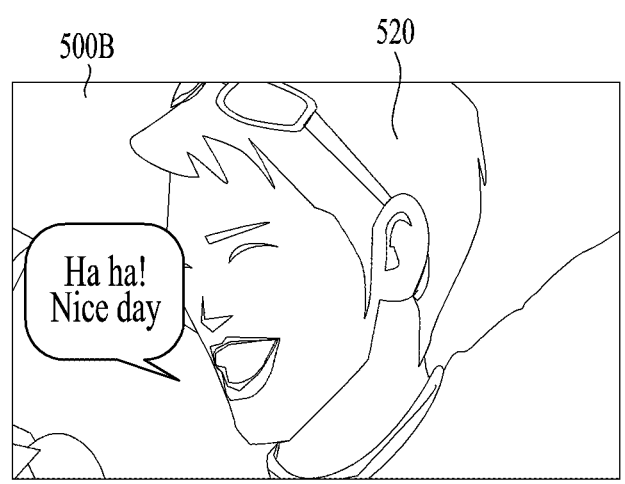

For another instance, referring to FIG. 15B, if the audio is amplified and outputted centering on a $2^{nd}$ subject 520 in the image 500, the controller 180 controls a region 500B containing the $2^{nd}$ subject 520 to be displayed in a manner of being enlarged from the image 500.

Meanwhile, referring to FIGS. 16A, 16B, 16C, 17A, 17B and 17C, if a specific region is enlarged from the image 500, the controller 180 can control the audio to be outputted in a manner of being amplified centering on a subject in the enlarged region.

In doing so, the controller 180 can differentiate an amplification level of the audio in accordance with an enlargement magnification of the region. In particular, if the enlargement magnification of the region increases, the controller can increase an amplification level of the audio gradually. If the enlargement magnification of the region decreases, the controller can decrease an amplification level of the audio gradually. On the other hand, if the enlargement magnification of the region increases, the controller can decrease an amplification level of the audio gradually. If the enlargement magnification of the region decreases, the controller can increase an amplification level of the audio gradually.

Figure 16A:
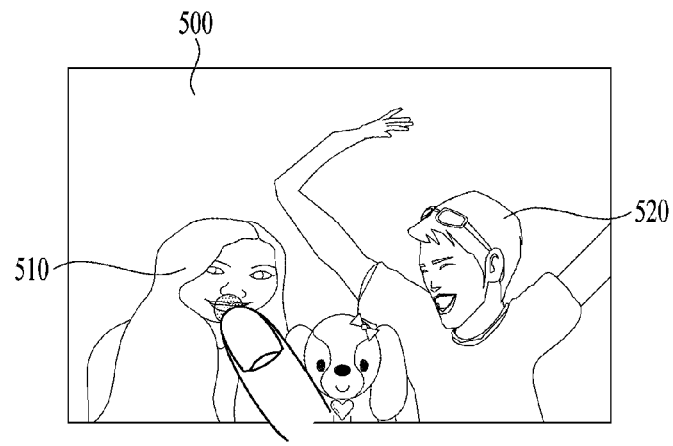
Figure 16B:
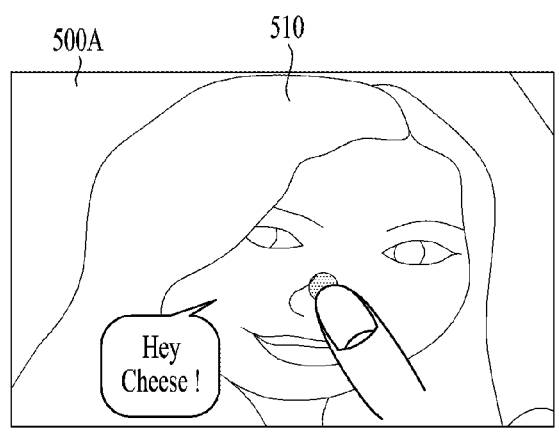
Figure 16C:
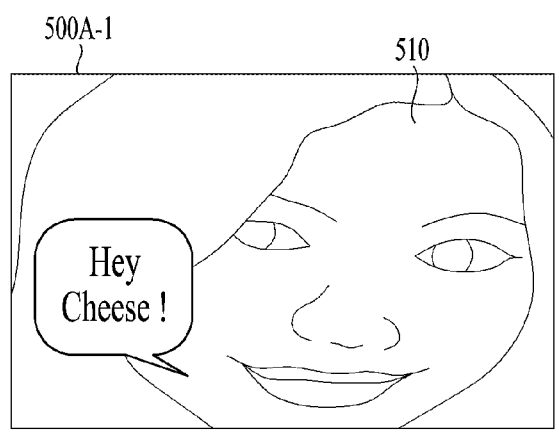

For instance, referring to FIGS. 16A, 16B and 16C, if a $1^{st}$ subject 510 in the image 500 is touched in a preset manner [FIG. 16A], the controller 180 displays a $1^{st}$ enlarged image 500A resulting from enlarging a region containing the $1^{st}$ subject 510 in the image 500 by 2 times and outputs the audio by amplifying the audio by 2 times centering on the $1^{st}$ subject 510. In this case, the touch in the preset manner shown in FIG. 16A may include a double tap touch of touching the $1^{st}$ subject 510 twice consecutively.

Moreover, if the $1^{st}$ subject 510 in the $1^{st}$ enlarged image 500A is touched in a double tap manner, the controller 180 displays a $2^{nd}$ enlarged image 500A-1 resulting from enlarging the region containing the $1^{st}$ subject 510 in the $1^{st}$ enlarged image 500A by two times again and outputs the audio resulting from amplifying the 2-time amplified audio by two times again centering on the $1^{st}$ subject 510.

Figure 17A:
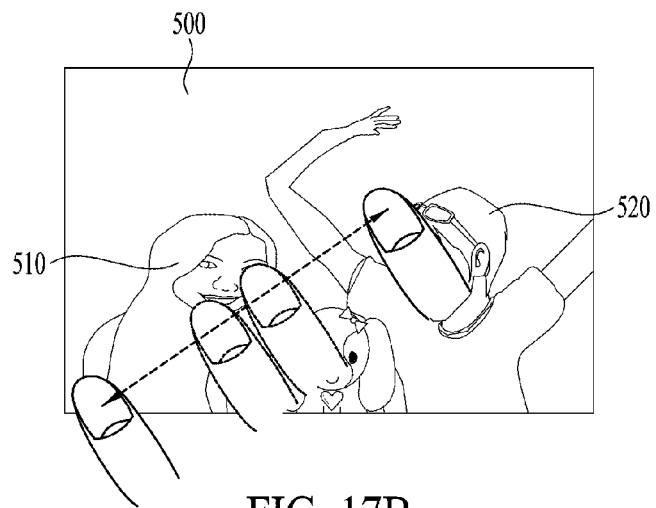
Figure 17B:
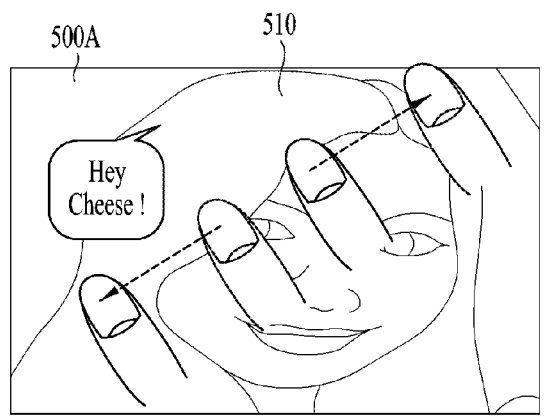
Figure 17C:
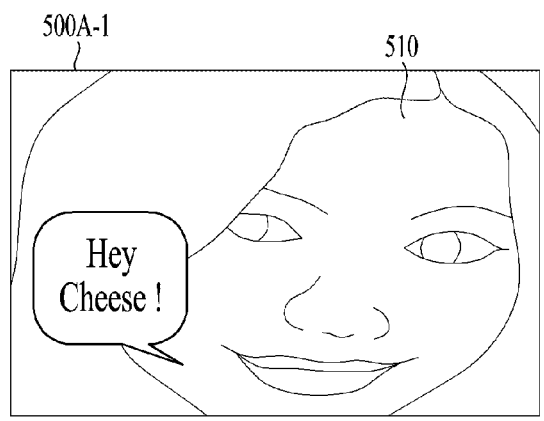

For another instance, referring to FIGS. 17A, 17B and 17C, if a pinch-out touch gesture is inputted to a $1^{st}$ subject 510 in the image 500 [FIG. 17A], the controller 180 gradually enlarges the image 500 into an enlarged image 500A/500A-1 in accordance with a pinch-out extent of the inputted pinch-out touch gesture and also controls the audio to be outputted in a manner of gradually increasing an amplification level of the audio in accordance with the pinch-out extent centering on the $1^{st}$ subject 510 [FIG. 17B, FIG. 17C].

In particular, if the subject 510 is gradually enlarged in the image 500, the controller 180 gradually increases the amplification level of the audio centering on the subject 510. While the subject 510 is enlarged, if the subject 510 is gradually reduced, the controller 180 gradually decreases the amplification level of the audio centering on the subject 510.

Figure 18A:
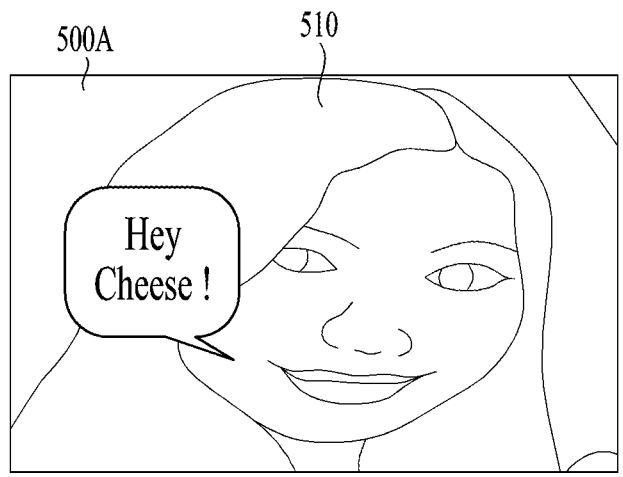

Referring to FIG. 18A, an enlarged image 500A resulting from enlarging a region having a subject 510 contained therein in the image 500 is displayed. And, the audio is currently outputted by being amplified centering on the subject 510.

Figure 18B:
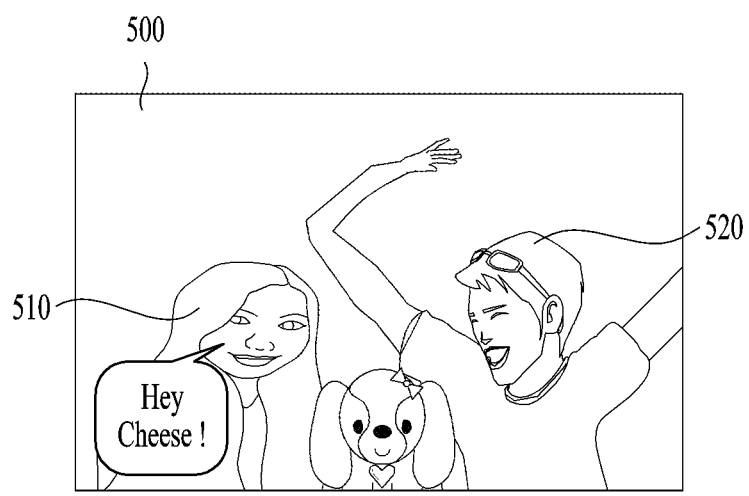

In doing so, referring to FIG. 18B, as the enlarged image 500A is reduced, if the original image 500 is displayed, the controller 180 can control the audio, which is currently outputted by being amplified centering on the subject 510, to be outputted again in size before the amplification.

Figure 19A:
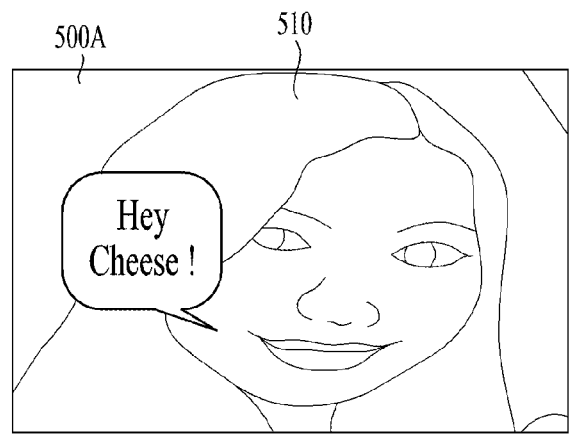

Referring to FIG. 19A, an enlarged image 500A resulting from enlarging a region having a subject 510 contained therein in the image 500 is displayed. And, the audio is currently outputted by being amplified centering on the subject 510.

Figure 19B:
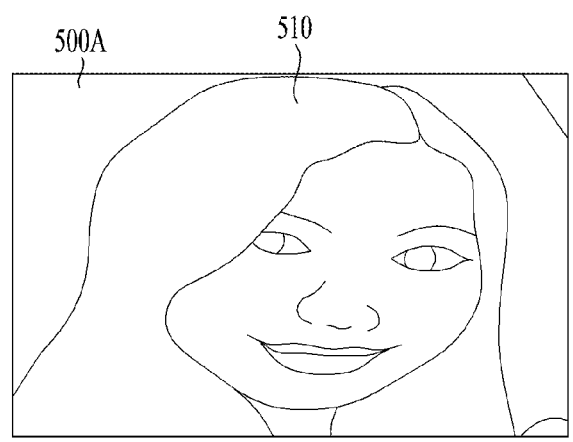
Figure 19C:
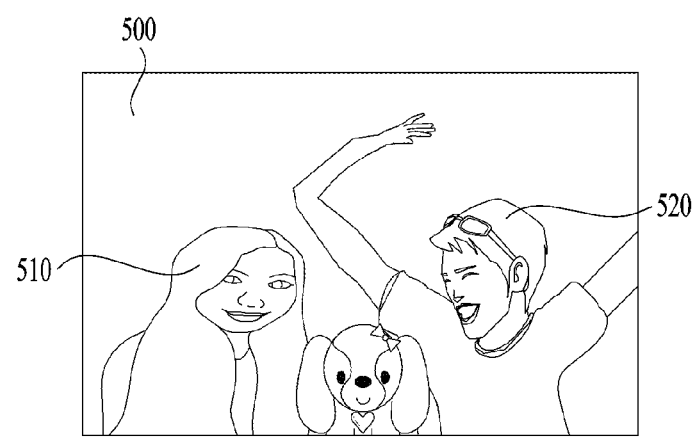

In doing so, if the output of the audio amplified centering on the subject 510 is ended [FIG. 19B], the controller 180 displays the original image 500 reduced from the enlarged image 500A [FIG. 19C].

Figure 20A:
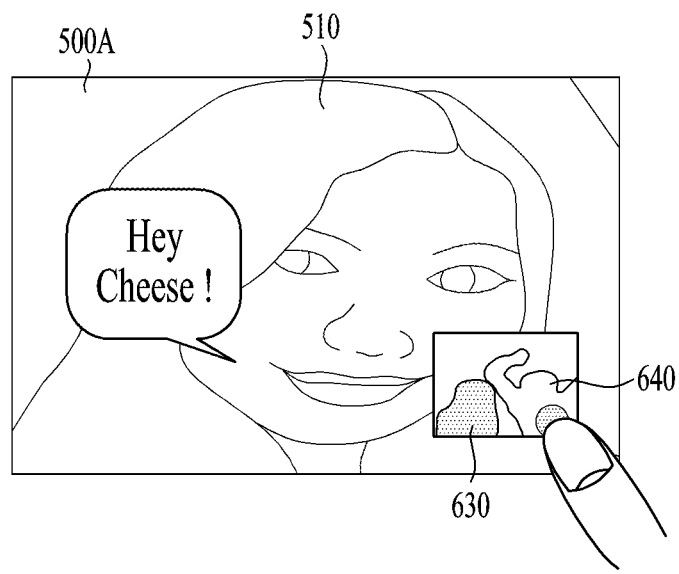

Referring to FIG. 20A, if a $1^{st}$ enlarged image 500A resulting from enlarging a region having a $1^{st}$ subject 510 contained therein in an image 500 containing the $1^{st}$ subject 510 and a $2^{nd}$ subject 520 is displayed, the controller 180 controls the audio to be outputted in a manner of being amplified centering on the $1^{st}$ subject 510.

Figure 20B:
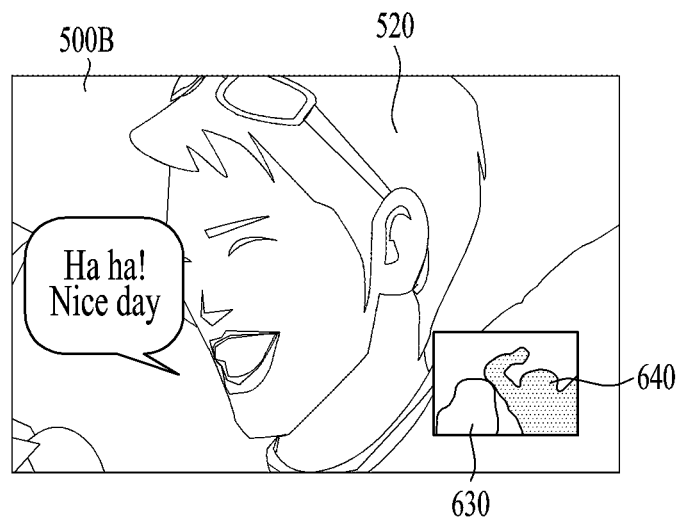

Referring to FIG. 20B, if a $2^{nd}$ enlarged image 500B resulting from enlarging a region having the $2^{nd}$ subject 520 contained therein in the image 500 containing the $1^{st}$ subject 510 and the $2^{nd}$ subject 520 is displayed, the controller 180 controls the audio to be outputted in a manner of being amplified centering on the $2^{nd}$ subject 520.

Moreover, if the $1^{st}$ enlarged image 500A is displayed and the audio is outputted by being amplified centering on the $1^{st}$ subject 510, the controller 180 displays a $1^{st}$ item 630 indicating the $1^{st}$ subject 510 and a $2^{nd}$ item 640 indicating the $2^{nd}$ subject 520.

In doing so, if the audio is amplified centering on the $1^{st}$ subject 510, the controller 180 can control the $1^{st}$ item 630 to be displayed in a manner of being emphasized more than the $2^{nd}$ item 640. If the audio is amplified centering on the $2^{nd}$ subject 520, the controller 180 can control the $2^{nd}$ item 640 to be displayed in a manner of being emphasized more than the $1^{st}$ item 630.

If the $1^{st}$ item 630 is selected, the controller 180 controls a region containing the $1^{st}$ subject 510 to be displayed in a manner of being enlarged from the original image 500 and also controls the audio to be outputted in a manner of being amplified centering on the $1^{st}$ subject 510.

If the $2^{nd}$ item 640 is selected, the controller 180 controls a region containing the $2^{nd}$ subject 520 to be displayed in a manner of being enlarged from the original image 500 and also controls the audio to be outputted in a manner of being amplified centering on the $2^{nd}$ subject 520.

Figure 21A:
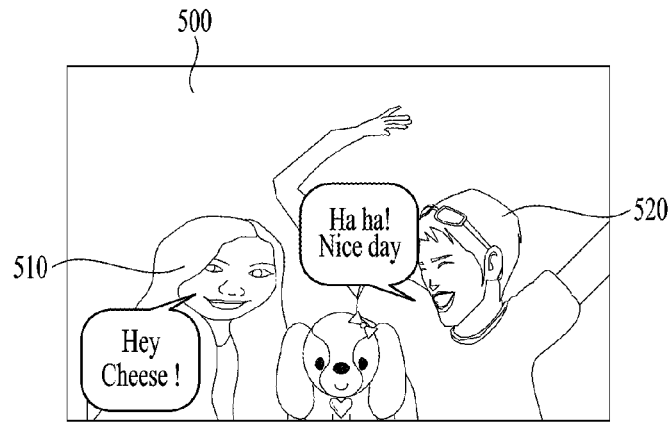
Figure 21B:
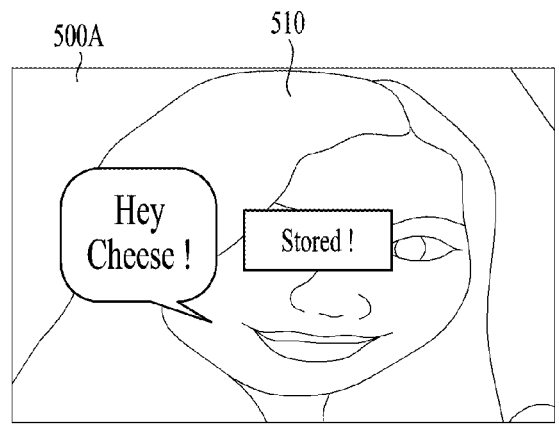
Figure 21C:
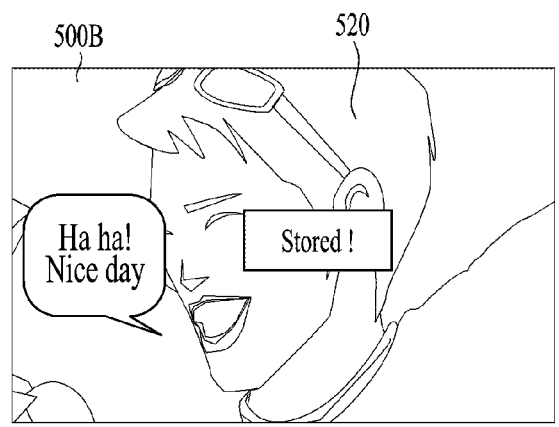

Finally, referring to FIGS. 21A, 21B and 21C, after the audio has been outputted centering on at least one subject contained in the image 500, if an output of the audio is ended, the controller 180 can save the audio amplified centering on the subject and an image of a region, in which the subject is contained in the image, in the memory 170.

In particular, if the audios are amplified centering on the $1^{st}$ and $2^{nd}$ subjects 510 and 520 contained in the image 500 and then stops being outputted [FIG. 21A], the controller 180 creates a $1^{st}$ audio file amplified centering on the $1^{st}$ subject 510, creates a $1^{st}$ image 500A of the region having the $1^{st}$ subject 510 contained therein within the image 500, and is then able to control the created $1^{st}$ audio file to be saved in the memory 170 in a manner of being linked to the created $1^{st}$ image 500A [FIG. 21B].

Moreover, if the audios are amplified centering on the $1^{st}$ and $2^{nd}$ subjects 510 and 520 contained in the image 500 and then stops being outputted, the controller 180 creates a $2^{nd}$ audio file amplified centering on the $2^{nd}$ subject 520, creates a $2^{nd}$ image 500B of the region having the $2^{nd}$ subject 520 contained therein within the image 500, and is then able to control the created $2^{nd}$ audio file to be saved in the memory 170 in a manner of being linked to the created $2^{nd}$ image 500B [FIG. 21C].

Accordingly, a mobile terminal and controlling method thereof according to the present invention provide various effects and/or features.

According to at least one of embodiments of the present invention, an audio of an audio file linked to an image is outputted in a manner of being amplified centering on a subject in the image, whereby a user can be provided with a further emotionally visual/auditory image viewer environment.

According to at least one of embodiments of the present invention, an audio is displayed by being amplified centering on a focused subject in an image, whereby a user can clearly listen to a voice or audio of the subject regarded as important in the image.

According to at least one of embodiments of the present invention, an audio is displayed in a manner of being amplified centering on an enlarged subject in an image, whereby a user can clearly listen to a voice or audio of the enlarged subject in the image.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a memory;
a camera configured to obtain image data including a first subject and a second subject;
a display;
a microphone;
an audio output unit; and
a controller operably coupled to the memory, the camera, the microphone, and the audio output unit, wherein the controller is configured to:
cause the display to display a preview image of the obtained image data;
recognize and select at least the first subject or the second subject in the image data;
capture the image data from the preview image in response to a first input;
cause the memory to store the captured image data and focus information related to at least the selected first subject or the selected second subject;
activate the microphone in response to a second input received after the image data is captured to obtain audio data to be linked to the stored image data;
cause the activated microphone to zoom in on at least a first sound generated from the selected first subject or a second sound generated from the selected second subject based on the focus information such that at least the first sound or second sound is selectively amplified while the audio data is obtained via the activated microphone;
cause the memory to store the obtained audio data such that the stored audio data and focus information are linked to the stored image data; and
cause the display to display the stored image data and cause the audio output unit to output the stored audio data based on the stored focus information,
wherein at least the first sound or the second sound is selectively amplified during the output of the stored audio data while the linked image data is displayed.

2. The mobile terminal of claim 1, wherein:
the captured image data is not video;
and
the first input is received prior to receiving the second input.

3. The mobile terminal of claim 1, wherein at least the first subject or the second subject is selected manually in response to a user input.

4. The mobile terminal of claim 1, wherein the focus information comprises at least a location of at least the first subject or the second subject, a size of at least the first subject or the second subject, a focal distance, a depth, or a distance from at least the first subject or the second subject.

5. The mobile terminal of claim 4, wherein when both the first subject and the second subject are selected, the controller is further configured to:
cause the audio output unit to amplify the first sound and the second sound selectively when the stored audio data is output; and
control amplification levels of the first sound and the second sound based on a first distance with respect to the first subject and a second distance with respect to the second subject such that the amplification level of the first sound and the amplification level of the second sound are different due to difference between the first distance and the second distance.

6. The mobile terminal of claim 4, wherein when both the first subject and the second subject are selected, the controller is further configured to:
cause the audio output unit to amplify the first sound and the second sound selectively when the stored audio data is output; and
control amplification levels of the first sound and the second sound based on a first size of the first subject and a second size of the second subject in the displayed image data such that the amplification level of the first sound and the amplification level of the second sound are different due to difference between the first size and the second size.

7. The mobile terminal of claim 1, wherein the controller is further configured to:
cause the audio output unit to amplify the first sound selectively during the output of the stored audio data; and
cause the display to enlarge the first subject in the displayed image data while the selectively amplified first sound is output via the audio output unit.

8. The mobile terminal of claim 1, wherein the controller is further configured to:
cause the display to display an indicator indicating that the displayed image data is linked to the stored audio data; and
cause the audio output unit to output the stored audio data in response to selection of the indicator.

9. The mobile terminal of claim 1, wherein the controller is further configured to:
cause the display to enlarge a size of the first subject in the displayed image data in response to a first input; and
cause the audio output unit to amplify the first sound selectively according to the enlarged first subject.

10. The mobile terminal of claim 9, wherein the controller is further configured to increase an amplification level of the first sound generally in proportion to a magnification level of the enlarged size first subject.

11. The mobile terminal of claim 10, wherein the controller is further configured to:
cause the display to reduce the size of the first subject in the displayed image data in response to a second input; and
cause the audio output unit to decrease the amplification level of the first sound generally in proportion to a reduction rate of the reduced size first subject.

12. The mobile terminal of claim 9, wherein the controller is further configured to:
cause the display to re-display the displayed image data in its original size; and
cause the audio output unit to output the audio data without selectively amplifying the first sound and the second sound.

13. The mobile terminal of claim 9, wherein the controller is further configured to:
cause the audio output unit to stop outputting of the audio data; and
cause the display to re-display the image data in its original size when the audio data is no longer output.

14. The mobile terminal of claim 9, wherein the controller is further configured to:
cause the memory to store image data including the enlarged size first subject as an image file;
cause the memory to store audio data including the amplified first sound as an audio file; and
link the stored image file to the stored audio file.

15. The mobile terminal of claim 1, wherein the controller is further configured to:
cause the camera to obtain the image data in which both the first subject and the second subject are selected;
cause the audio output unit to output the stored audio data such that the first sound is selectively amplified in response to selection of the first subject in the displayed image data; and
cause the audio output unit to output the stored audio data such that the second sound is selectively amplified in response to selection of the second subject in the displayed image data.

16. The mobile terminal of claim 15, wherein the controller is further configured to cause the display to display a first indicator corresponding to the first subject and a second indicator corresponding to the second subject while the image data is displayed.

17. The mobile terminal of claim 16, wherein the controller is further configured to cause the display to display:
the first indicator in a first format while the first sound is amplified during the output of the stored audio data;
the second indicator in a second format while the first sound is amplified during the output of the stored audio data;
the second indicator in the first format while the second sound is amplified during the output of the stored audio data; and
the first indicator in the second format while the second sound is amplified during the output of the stored audio data.

18. The mobile terminal of claim 16, wherein the controller is further configured to cause the audio output unit to:
amplify the first sound in response to selection of the first indicator; and
amplify the second sound in response to selection of the second indicator.

19. The mobile terminal of claim 1, wherein:
the first subject is recognized by face recognition algorithm;
the obtained audio data comprises the first sound corresponding to a voice of the first subject included in the displayed image data; and
the first subject is displayed distinctively in the displayed image data while the voice of the first subject is output to indicate that the voice corresponds to the distinctively displayed first subject.

20. A method of controlling a mobile terminal comprising a camera, microphone, a display, and an audio output unit, the method comprising:
obtaining, via the camera, image data including a first subject and a second subject;
displaying, via the display, a preview image of the obtained image data;
capturing the image data from the preview image in response to a first input;
storing the captured image data and focus information related to at least the selected first subject or the selected second subject;
activating the microphone in response to a second input received after the image data is captured to obtain audio data to be linked to the stored image data;
zooming in on at least a first sound generated from the selected first subject or a second sound generated from the selected second subject based on the focus information such that at least the first sound or second sound is selectively amplified while the audio data is obtained via the activated microphone;
storing the obtained audio data such that the stored audio data and focus information are linked to the stored image data; and
displaying the stored image data on the display and outputting the stored audio data via the audio output unit based on the stored focus information,
wherein at least the first sound or the second sound is selectively amplified during the output of the stored audio data while the stored image data is displayed.

* * * * *